No. 749,648. PATENTED JAN. 12, 1904.
J. V. WASHBURNE & G. J. RICHARD.
FASTENING DEVICE FOR GARMENTS.
APPLICATION FILED MAY 13, 1901.
NO MODEL.

Witnesses
Chas H. Smith
J. Staib

Inventors
James V. Washburne
George J. Richard
by L. W. Serrell & Son
Attys

No. 749,648. Patented January 12, 1904.

UNITED STATES PATENT OFFICE.

JAMES V. WASHBURNE AND GEORGE J. RICHARD, OF WATERBURY, CONNECTICUT, ASSIGNORS TO SAID WASHBURNE.

FASTENING DEVICE FOR GARMENTS.

SPECIFICATION forming part of Letters Patent No. 749,648, dated January 12, 1904.

Application filed May 13, 1901. Serial No. 59,940. (No model.)

*To all whom it may concern:*

Be it known that we, JAMES V. WASHBURNE and GEORGE J. RICHARD, citizens of the United States, residing at Waterbury, in the county of New Haven and State of Connecticut, have invented an Improvement in Fastening Devices for Garments, of which the following is a specification.

Our invention relates to fastening devices for garments of the class known as "stud-and-socket" or "snap" fasteners, and while these fastening devices are primarily designed for use upon gloves they are also adapted for use upon dresses and underclothing.

Our invention comprises two substantially cup-shaped members differentiated in size and adapted to be snapped into connection, the larger member receiving and holding the smaller member, one cup-shaped member, preferably the larger, having inwardly-turned side walls that are advantageously made continuous, and the other or smaller cup-shaped member having resilient side walls outwardly overturned from the walls of the member and preferably made continuous, but which may be readily slit at spaced-apart intervals. The outwardly-overturned side walls of the smaller cup-shaped members may have the edges inwardly or under turned. These cup-shaped members are advantageously secured to intervening flexible material or fabric by eyelets; but they may be fastened in any desired manner.

Figure 1:
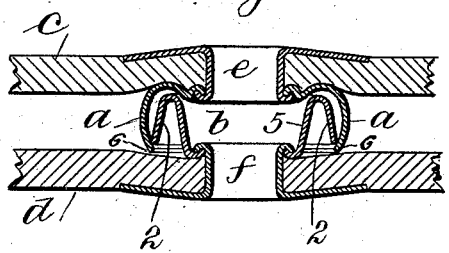
Figure 2:
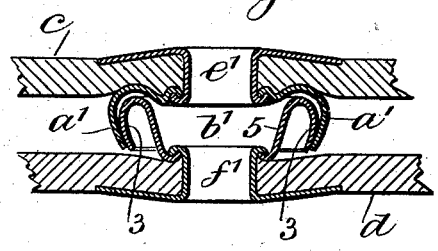
Figure 3:
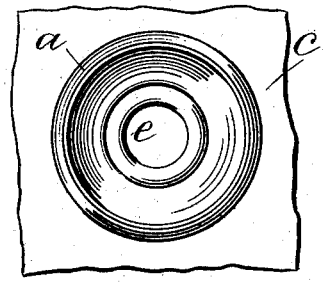
Figure 4:
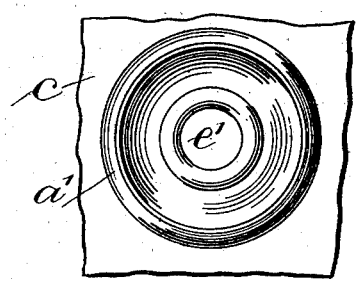
Figure 5:
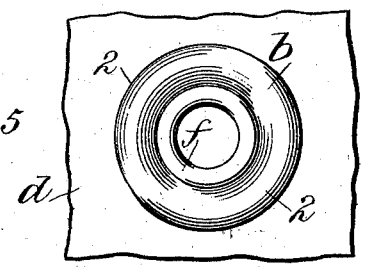
Figure 6:
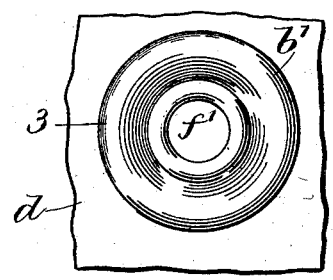
Figure 7:
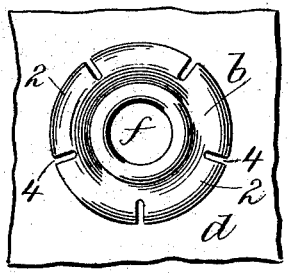
Figure 8:
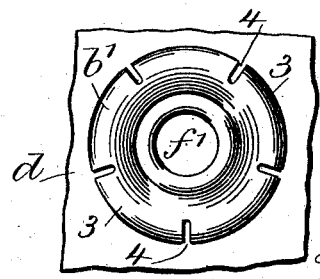

In the drawings, Figures 1 and 2 are vertical sections representing forms of our invention. Figs. 3 and 4 are inverted plan views of the larger cup-shaped members shown in Figs. 1 and 2. Figs. 5 and 6 are plan views of the smaller cup-shaped members shown in Figs. 1 and 2; and Figs. 7 and 8 are plan views of the smaller cup-shaped members, indicating that the same may be provided with radial slits at spaced-apart intervals.

$a\ a'$ represent the outer cup-shaped members shown in Figs. 1 and 2, and $e\ e'$ eyelets by which the same are preferably secured to intervening flexible material or fabric $c$. These cup-shaped members $a\ a'$ are each provided with inwardly-turned side walls that are preferably made and are shown as continuous. They differ slightly, however, in their cross-sectional configuration, the inwardly-turned side walls of the member $a'$ (shown in Figs. 2 and 4) being slightly more pronounced than similar parts of the member $a$, Figs. 1 and 3.

$b\ b'$ represent the inner cup-shaped members, Figs. 1 and 2, and $f\ f'$ attaching-eyelets, preferably employed for connecting said inner cup-shaped members to the intervening fabric $d$. While these attaching-eyelets will usually be and are preferably employed, we do not herein limit ourselves to their use, as other devices might be employed for attaching the cup-shaped parts to the fabric.

Our improvements relate especially to the inner cup-shaped members, which are differentiated in size from the larger or outer cup-shaped members and which are adapted, as hereinbefore stated, to be snapped into connection with the larger members and to be held by the larger members.

The inner cup-shaped members $b\ b'$, which might be styled "stud" members, are shown as provided with inner and outer side walls. The outer side walls 2 3 are resilient and constitute bent-over continuations of the inner side walls. The free edge of the outer side walls 2, Fig. 1, is of slightly greater diameter than the outer free edge 6 of the outer member. The outer side walls 3, Fig. 2, are inturned, and the free edge thereof is of slightly less diameter than the outer part of the other member. The outer side walls 2 3 of the inner cup-shaped members $b\ b'$ may be made circumferentially continuous, as shown in Figs. 1, 5, and 2, 6, or they may be radially split, as shown in Figs. 7 and 8.

With the form of invention shown in Fig. 1 and as the cup-shaped parts are snapped into connection the edge of the outer wall passes over the overturned side walls of the inner member and slightly below the free edge of the said member, so that the cup-shaped member $b$ is wholly within the cup-shaped member $a$, the contact being between the inner surface of the member $a$ and the free edge of the overturned side walls, while in Fig. 2 the outwardly-overturned or outer side walls 3 of the member $b'$ are shown as inturned to more closely conform to or coincide with the configuration of the cup-shaped member $a'$, so that when the inner member is received by the outer member there are surfaces in juxtaposition that are in actual contact of appreciable area. The outer wall of the stud member has a free resilient edge, and said wall is a bent-over continuation of the inner wall. We do not limit ourselves to the precise form as shown in either Fig. 1 or Fig. 2.

While we have herein spoken of the smaller cup-shaped part or member as being provided with inner and outer side walls, the outer wall being outwardly overturned from the inner continuous wall or, in other words, being a bent-over continuation of the inner wall, it is equally apparent that these inner and outer side walls constitute double side walls and that they may, as shown, be of substantially the same proportions.

In Figs. 7 and 8 we have illustrated the overturned side walls 2 of the inner member $b$ and the overturned and inturned side walls 3 of the member $b'$ as provided with radial slits 4. These are made through the overturned portions to the inner walls of the main portion of the cup, and they act to impart to the overturned side walls greater elasticity or, in other words, a pronounced yielding function rather than the more rigid character of the overturned side walls, as shown in Figs. 1, 2, 5, and 6, and we do not herein limit ourselves to making the overturned side walls 2 and 3 either continuous or with radial slits, as either form may be employed by us according to the circumstances and the results desired.

We claim as our invention—

1. In a fastening device the combination with a cup-shaped part or member, of a smaller cup-shaped part or member having resilient side walls outwardly overturned from the walls of the member and adapted to be snapped into connection with the larger cup-shaped part and to be held thereby, and means for connecting the respective parts to parts of a garment to be held together, substantially as set forth.

2. In a fastening device comprising two cup-shaped parts or members differentiated in size and adapted to be snapped into connection, whereby the smaller part is received and held by the larger part, the outer larger part having inwardly-turned side walls and the smaller part being provided with resilient side walls outwardly overturned from the inner continuous walls of the smaller part or member, and means for connecting the respective parts to parts of a garment to be held together, substantially as set forth.

3. In a fastening device comprising two cup-shaped parts or members differentiated in size and adapted to be snapped into connection, the smaller part being provided with resilient side walls, outwardly overturned from the walls of the member, whereby the smaller part or member is received in and held by the larger part at the free edge of said resilient side walls, and means for connecting the respective parts to parts of a garment to be held together, substantially as set forth.

4. In a fastening device the combination with a cup-shaped part or member, of a smaller cup-shaped part or member having radially-slit side walls outwardly overturned from the walls of the member and adapted to be snapped into connection with the larger cup-shaped part and to be held thereby and means for connecting the respective parts to parts of a garment to be held together, substantially as set forth.

5. In a stud-and-socket fastening device comprising two members, a stud member having inner and outer side walls, the outer wall having a free resilient edge and being a bent-over continuation of the inner wall, and means for connecting the inner wall of the stud member to material.

6. In a stud-and-socket fastening device, comprising two members, a stud member having double side walls of substantially the same proportions, the outer of which side walls is a bent-over continuation of the inner side wall, and means for connecting the inner wall of the stud member to material.

Signed by us this 6th day of May, 1901.

JAMES V. WASHBURNE.
GEORGE J. RICHARD.

Witnesses:
INA F. BRIGGS,
PATRICK J. MCMAHON.